United States Patent Office 3,134,715
Patented May 26, 1964

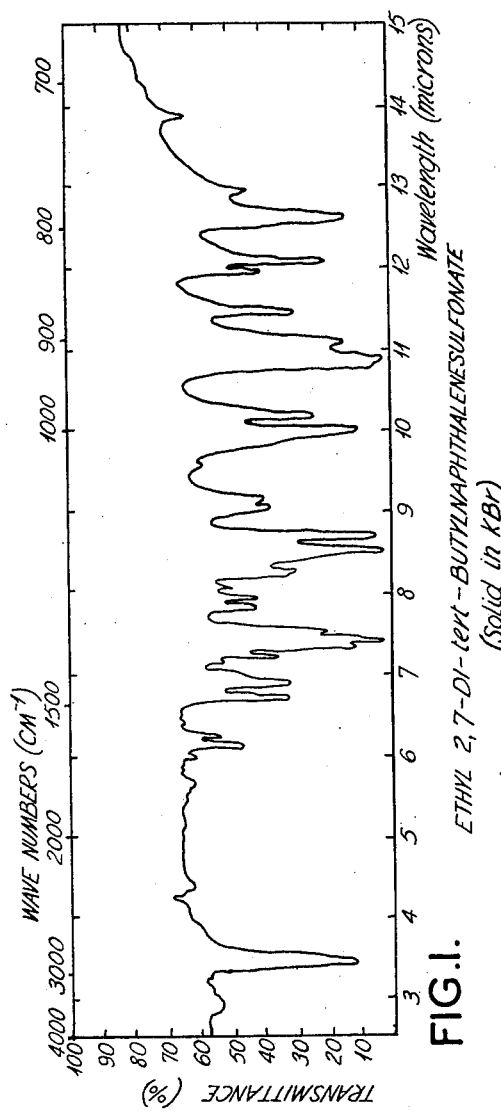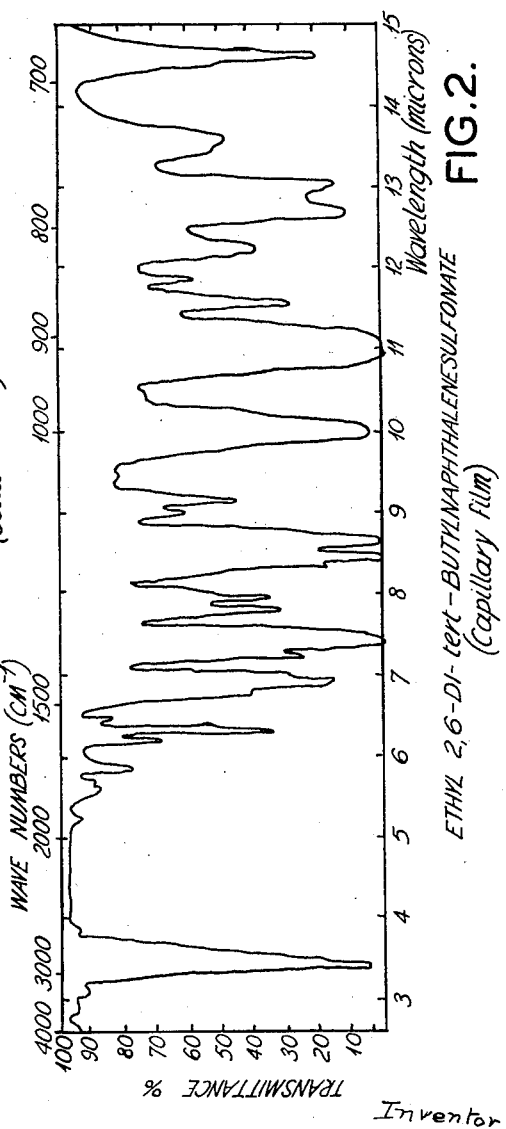

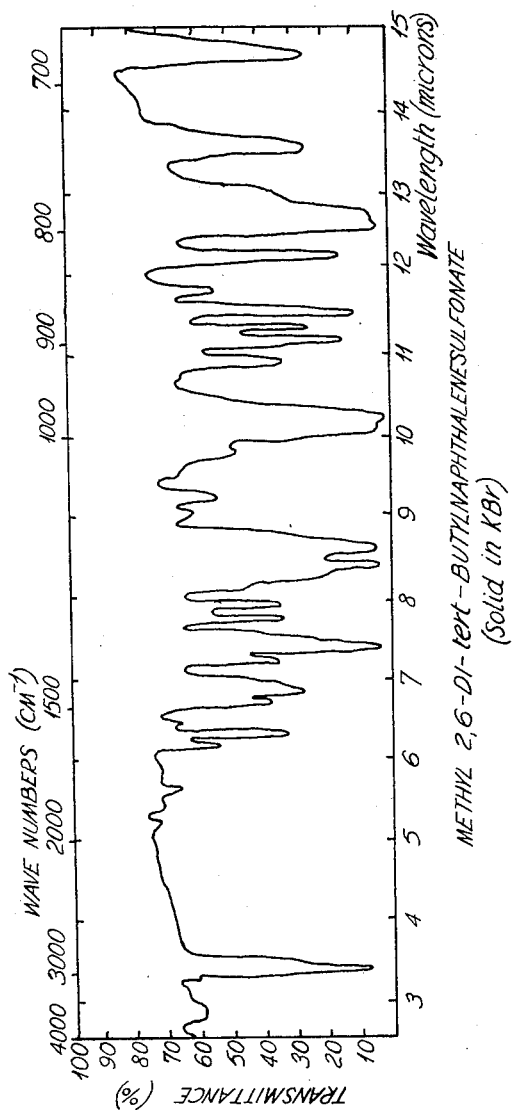

---

3,134,715
LOWER ALKYL ESTERS OF DI-TERTIARY-BUTYL-NAPHTHALENE-4-SULFONIC ACID
Leonard Mitchell, 371 Simcoe Ave., Mount Royal, Quebec, Canada
Filed June 16, 1960, Ser. No. 36,576
17 Claims. (Cl. 167—55)

This invention relates to new esters of di-tertiary-butylnaphthalene-sulfonic acids and to anti-tussive compositions containing such esters.

Sodium di-tertiary-butylnaphthalene-sulfonate is a well known anti-tussive agent and as such has been extensively used in anti-tussive preparations. Unfortunately this compound has a very bitter taste so that strong flavoring is needed if a platable preparation is to be obtained; complete masking of this taste is extremely difficult, if not impossible.

It is an object of the present invention to provide new derivatives of di-tertiary-butylnaphthalene-sulfonic acids having anti-tussive activity, in the guinea pig, comparable with that of the sodium salt.

It is a further object of the invention to provide new derivatives of di-tertiary-butylnaphthalene-sulfonic acids having anti-tussive activity, in the guinea pig, comparable with that of the sodium salt and having no taste or a taste substantially less unpleasant than that of the sodium salt.

It has now been found that esters of di-tertiary-butylnaphthalene-sulfonic acids have anti-tussive activity comparable with that of sodium di-tertiary-butylnaphthalene-sulfonate and are substantially less unpleasant in taste than the sodium salt. Many of these esters are actually tasteless and odorless. They have little or no detergent activity in contrast to the sodium salt which does have such activity.

The present invention provides, as new compounds, esters of 2,6- and 2,7-di-tertiary-butylnaphthalene-4-sulfonic acids. The esterifying group may be an alkyl, cycloalkyl, aryl or arylalkyl radical, for example methyl, ethyl, n-propyl, isopropyl, n-butyl, sec-butyl, amyl, hexyl, octyl, phenyl, benzyl, cyclohexyl, diethylaminoethyl and the residues obtained by removal of an alcoholic hydrogen atom from ethylene glycol, glycerol and glycolic acid. The term "alkyl" is meant to include compounds with up to and including eight carbon atoms in the straight or branched chain as may be seen from the foregoing list.

The commercially available sodium di-tertiary-butylnaphthalene-sulfonate is obtained by sulfonation of a mixture of 2,6- and 2,7-di-tertiary-butylnaphthalenes. The mixture of sulfonates thereby obtained is used directly in the formulation of anti-tussive preparations without separation of the isomeric sulfonates it contains. It has never been established whether the anti-tussive activity is derived from only one or from both of these isomers. Also, it has not been certain at what position on the naphthalene nucleus the sulfonation takes place. The applicant's investigations have revealed that, in fact, the sulfonation takes place at the 4-position.

The esters of the present invention may be obtained by reacting 2,6- or 2,7-di-tertiary-butylnaphthalene-4-sulfonyl chloride with a compound containing a reactive hydroxy group, preferably in the presence of an organic base, for example pyridine, which serves to take up the acid formed in the reaction.

The sulfonyl chlorides of 2,6- and 2,7-di-tertiary-butylnaphthalene may be obtained by the action of thionyl chloride on the free sulfonic acids. The latter can be produced in pure form by the sulfonation of 2,6- or 2,7-di-tertiary-butylnaphthalene with chlorosulfonic acid. However, pure isomers of di-tertiary-butylnaphthalene are not readily available and for commercial purposes the most feasible method of obtaining the 4-sulfonyl chlorides employs as its starting material the mixture of the sodium salts of the 4-sulfonic acids of the 2,6 and 2,7 isomers which has previously been used in anti-tussive preparations. Belgian Patent No. 520,742 describes a manner of preparing such a mixture. Treatment of the mixture of the sodium salts with thionyl chloride produces a mixture of the 4-sulfonyl chlorides of the 2,6 and 2,7 isomers from which the two sulfonyl chlorides can be separated by fractional crystallization.

The lower alkyl esters of the invention may be obtained by treatment of 2,6- or 2,7-di-tertiary-butylnaphthalene sulfonic acid with a diazo-paraffin; thus reaction of the acid with diazomethane yields the methyl ester and with diazoethane the ethyl ester.

The esters of the present invention are found to possess significant anti-tussive activity in the guinea pig. For example the ethyl esters of 2,6- and 2,7-di-tertiary-butylnaphthalene-4-sulfonic acids have anti-tussive activity in the guinea pig which is about equal to that of a mixture of the sodium salts of these acids. There appears to be no great difference in anti-tussive activity between the 2,6 and 2,7 isomers of the ethyl ester.

The following examples illustrate the manner of preparing certain useful intermediates as well as a number of the esters of the invention. Temperatures are given in degrees centigrade.

EXAMPLE 1

*2,6-Di-Tertiary-Butylnaphthalene-4-Sulfonic Acid*

56 g. (0.48 mole) of chlorosulfonic acid were slowly added, with stirring and cooling, to a solution of 116 g. (0.48 mole) of pure 2,6-di-tertiary-butylnaphthalene (H. Kesparek and H. Fisher, German Patent No. 947,966) in 240 ml. of dichloroethane. At the end of the addition the reaction mixture was allowed to stand for two hours at 0–5° and the solvent removed at room temperature under reduced pressure. The residue, a heavy oil, started to crystallize upon the addition of 0.5 mole of water; after recrystallization from dichloroethane it gave 155 g. (95%) of the hydrate of 2,6-di-tertiary-butylnaphthalene-4-sulfonic acid as white plates melting at 158°.

Calculated for $C_{18}H_{24}O_3S \cdot H_2O$: C, 63.87%; H, 7.74%; M.W., 338.45. Found: C, 63.45%; H, 7.76%; N.E. 339.3.

EXAMPLE 2

*2,7-Di-Tertiary-Butylnaphthalene-4-Sulfonic Acid*

3.3 g. of 2,7-di-tertiary-butylnaphthalene were (C. C. Price et al.; J. Org. Chem. 7,517 (1942)) dissolved in 7 ml. of dichloroethane and treated, as described in Example 1 with 1.8 g. of chlorosulfonic acid. There was obtained 2.6 g. (55%) of the hydrate of 2,7-di-tertiary-butylnaphthalene-4-sulfonic acid melting at 140–142° (chloroform-petroleum ether).

Calculated for $C_{18}H_{24}O_3S \cdot H_2O$: C, 63.87%; H, 7.74%; M.W., 338.45. Found: C, 62.54%; H, 7.82%; N.E., 339.4.

EXAMPLE 3

*2,6-Di-Tertiary-Butylnaphthalene-4-Sulfonyl Chloride*

The anhydrous residue obtained from the reaction of 56 g. of chlorosulfonic acid and 116 g. of 2,6-di-tertiary-butylnaphthalene in 240 ml. of dichloroethane was mixed in a distillation apparatus, with 90.7 ml. of thionyl chloride and 3 ml. of dimethylformamide. The mixture was stirred and heated on the steam bath until it became homogeneous (½ hour). During that time most of the excess of thionyl chloride had distilled over; the remainder was removed under reduced pressure. The residue was triturated with cold water (350 ml.) and extracted with ether (3 × 100 ml.). The combined ether extracts were dried and concentrated; the solid residue was recrystallized from alcohol and gave 133.5 g. (86%) of the sulfonyl chloride melting at 117–118°.

Calculated for $C_{18}H_{23}O_2SCl$: C, 63.79%; H, 6.84%. Found: C, 64.03%; H, 6.97%.

EXAMPLE 4

*2,7-Di-Tertiary-Butylnaphthalene-4-Sulfonyl Chloride*

1.3 g. of 2,7-di-tertiary-butylnaphthalene - 4 - sulfonic acid treated as described in Example 3 with 5 ml. of thionyl chloride and 2 drops of dimethylformamide gave 1.17 g. (90%) of 2,7-di-tertiary-butylnaphthalene - 4- sulfonyl chloride melting at 167–169° (ligroin).

Calculated for $C_{18}H_{23}O_2SCl$: C, 63.79%; H, 6.84%. Found: C, 63.97%; H, 7.01%.

EXAMPLE 5

*2,6- and 2,7-Di-Tertiary-Butylnaphthalene-4-Sulfonyl Chlorides*

34.6 g. (0.1 mole) of a mixture of sodium di-tertiary-butylnaphthalene sulfonates prepared according to the Belgian Patent No. 520,742, 25 ml. of thionyl chloride and 0.8 ml. of dimethylformamide were heated for 1 hour on the steam-bath. The excess of thionyl chloride was stripped off under reduced pressure and the residue was triturated with 100 ml. of cold water, filtered and dried over sulfuric acid. The dried mixture of sulfonyl chlorides (36.2 g.) was recrystallized in 100 ml. of ligroin, with the aid of 3 g. of decolorizing charcoal; there was so obtained 12.3 gr. (36%) of pure 2,7-di-teriary-butylnaphthalene-4-sulfonyl chloride giving no melting point depression with a sample prepared from 2,7-di-tertiary-butylnaphthalene. Upon concentration of the mother liquors and repeated recrystallizations of the residue from isopropyl alcohol 8.2 g. (24.3%) of the 2,6-di-tertiary-butylnaphthalene-4-sulfonyl chloride, giving no melting point depression with a sample prepared from 2,6-di-tertiary-butylnaphthalene, were obtained.

EXAMPLE 6

*Ethyl Ester of 2,7-Di-Tertiary-Butylnaphthalene-4-Sulfonic Acid*

2,7-di-tertiary-butylnaphthalene sulfonyl chloride (0.06 mole) was added very slowly to a solution of (0.12 mole) ethyl alcohol in 80 ml. dry pyridine. The temperature was kept between −10° and −5° during the addition. After it was completed the mixture was stirred for 2 hours, the temperature being maintained between 0° and 5°. Ice water (80 ml.) was then added and the precipitated ester was filtered, dried and recrystallized. 17 g. (80%) of colorless crystals, M.P. 138–139°, were obtained.

Calculated for $C_{20}H_{28}O_3S$: C, 68.93%; H, 8.09%. Found: C, 69.32%; H, 8.20%.

U.V. spectrum: $\lambda_{max.}$ 293 m$\mu$, $\lambda_{max.}$ 321 m$\mu$, inflection 306 m$\mu$.

The infra-red spectrum of the compound of this example is shown in FIG. 1 of the accompanying drawings.

EXAMPLE 7

*n-Propyl Ester of 2,7-Di-Tertiary-Butylnaphthalene - 4- Sulfonic Acid*

This ester was produced by the procedure of Example 6, ethyl alcohol being substituted by n-propyl alcohol. There were obtained 15 g. of crude product, recrystallized from 35 ml. EtOH and 15 ml. H$_2$O to give 12.6 g. of colorless crystals, M.P. 109–10°.

Calculated for $C_{21}H_{30}O_3S$: C, 69.57%; H, 8.34%. Found: C, 69.57%; H, 8.36%.

U.V. spectrum: $\lambda_{max.}$ 294,321 m$\mu$, inflection 306 m$\mu$.

EXAMPLE 8

*n-Butyl-Ester of 2,7-Di-Tertiary-Butylnaphthalene - 4- Sulfonic Acid*

This ester was produced by the procedure of Example 6, ethyl alcohol being substituted by n-butyl alcohol. There were obtained 15.2 g. crude ester, recrystallized from 35 ml. EtOH and 5 ml. H$_2$O to give 8 g. of colorless crystals, M.P. 74–5°.

Calculated for $C_{22}H_{32}O_3S$: C, 70.17%; H, 8.56%. Found: C, 70.54%; H, 8.47%.

U.V. spectrum: $\lambda_{max.}$ 294 m$\mu$, $\lambda_{max.}$ 321 m$\mu$, inflection 302 m$\mu$.

EXAMPLE 9

*n-Hexyl Ester of 2,7-Di-Tertiary-Butylnaphthalene - 4- Sulfonic Acid*

This ester was produced by the procedure of Example 6, ethyl alcohol being substituted by n-hexyl alcohol. There were obtained 21.2 g. crude ester, recrystallized from 75 ml. EtOH to give 15.7 g. of colorless crystals, M.P. 77–8°.

Calculated for $C_{24}H_{36}O_3S$: C, 71.24%; H, 8.96%. Found: C, 71.28%; H, 8.99%.

U.V. spectrum: $\lambda_{max.}$ 294 m$\mu$, $\lambda_{max.}$ 321 m$\mu$, inflection 306 m$\mu$.

EXAMPLE 10

*Phenyl Ester of 2,7-Di-Tertiary-Butylnaphthalene-4-Sulfonic Acid*

This ester was produced by the procedure of Example 6, ethyl alcohol being substituted by phenol. The phenyl ester crystallized on standing overnight (10 g.) and was recrystallized from 50 ml. of ethanol to give 8.5 g. of colorless crystals, M.P. 78–79°.

Calculated for $C_{24}H_{28}O_3S$: C, 72.69%; H, 7.12%. Found: C, 72.86%; H, 7.12%.

U.V. spectrum: $\lambda_{max.}$ 296 m$\mu$, 322 m$\mu$, inflection 306 m$\mu$.

EXAMPLE 11

*Cyclohexyl Ester of 2,7-Di-Tertiary-Butylnaphthalene-4-Sulfonic Acid*

This ester was produced by the procedure of Example 6, ethyl alcohol being substituted by cyclohexyl alcohol. There was obtained 10.0 g. of pure ester recrystallized from ethanol, of M.P. 124°.

Calculated for $C_{24}H_{34}O_3S$: C, 71.59%; H, 8.51%. Found: C, 71.77%; H, 8.48%.

U.V. spectrum: $\lambda_{max.}$ 293 m$\mu$, 322 m$\mu$, inflection 306 m$\mu$.

EXAMPLE 12

*Glycolyl Monoester of 2,7-Di-Tertiary-Butylnaphthalene-4-Sulfonic Acid*

25 gr. (0.074 mole) of 2,7-di-tertiary-butylnaphthalene-4-sulfonyl chloride were allowed to react with 9 gr. (0.145 mole) of ethylene glycol in 80 ml. of pyridine. After the addition of water the separated oil was extracted with 3 × 50 ml. of ether, the combined organic layers were washed with 5% HCl, dried and concentrated. The residual oil was induced to crystallize in carbon tetrachloride-petroleum ether and recrystallized from ethyl acetate-petroleum ether. There were obtained 19.5 g. (72%) o fcolorless crystals melting at 85–87°.

Calculated for $C_{20}H_{28}O_4S$: C, 65.90%; H, 7.74%. Found: C, 66.93%; H, 8.31%.

U.V. spectrum: $\lambda_{max.}$ 294 m$\mu$, $\lambda_{max.}$ 322 m$\mu$, inflection 306 m$\mu$.

EXAMPLE 13

*Glyceryl Monoester of 2,7-Di-Tertiary-Butylnaphthalene-4-Sulfonic Acid*

10 g. (0.03 mole) of 2,7-di-tertiary-butylnaphthalene-4-sulfonyl chloride were allowed to react with 8.2 gr.

(0.09 mole) of anhydrous glycerol in 50 ml. of pyridine in the same manner as for ethylene glycol in Example 12. The residual oil was induced to crystallize in ethyl acetate-petroleum ether and recrystallized from the same mixed solvent as used in Example 12. There were obtained 8 g. (70%) of colorless crystals melting at 135–136°.

Calculated for $C_{21}H_{30}O_5S$: C, 63.93%; H, 7.67%. Found: C, 64.47%; H, 7.72%.

U.V. spectrum: $\lambda_{max.}$ 294 m$\mu$, $\lambda_{max.}$ 322 m$\mu$, inflection 306 m$\mu$.

EXAMPLE 14

Ethyl Ester of 2,6-Di-Tertiary-Butylnaphthalene-4-Sulfonic Acid (a) To a cooled solution of 30 g. of the monohydrate of 2,6-di-tertiary-butylnaphthalene-4-sulfonic acid in 400 ml. of ether there was slowly added a solution of diazoethane in ether; the orange color of the diazoethane solution was discharged at once and nitrogen was evolved. Enough of the diazoethane solution was added so that a persistent yellow color remained in the flask. The reaction mixture was allowed to stand overnight, the solvent was removed and the oily residue distilled under reduced pressure. The ethyl ester was obtained in the form of a heavy colorless oil boiling at 180–185° under 1 mm.

Calculated for $C_{20}H_{28}O_3S$: C, 68.93%; H, 8.09%. Found: C, 68.92%; H, 8.26%.

U.V. spectrum: $\lambda_{max.}$ 286 m$\mu$, $\lambda_{max.}$ 311 m$\mu$, $\lambda_{max.}$ 326 m$\mu$.

(b) A solution of 0.5 g. of absolute ethyl alcohol in 5 ml. of dry pyridine was cooled to −10°; 2 g. of powdered 2,6-di-tertiary-butylnaphthalene-4-sulfonyl chloride were slowly added to this solution at such a rate that the temperature would not exceed −5° and the resulting mixture was stirred for two hours at 0–5°. 20 ml. of cold water were slowly added and the mixture was extracted with ether (3 x 20 ml.). The combined ether extracts were washed with dilute hydrochloric acid and water, dried and concentrated to give 0.9 g. (43%) of the oily ethyl ester.

The infra-red spectrum of the compound of this example is shown in FIG. 2 of the accompanying drawings.

EXAMPLE 15

Methyl Ester of 2,6-Di-Tertiary-Butylnaphthalene-4-Sulfonic Acid

This ester was obtained in 92% yield by reacting 2,6-di-tertiary-butylnaphthalene-4-sulfonic acid with diazomethane according to the procedure described in Example 14(a). Colorless prisms melting at 123–124° (methanol) were obtained.

Calculated for $C_{19}H_{26}O_3S$: C, 68.22%; H, 7.84%; S, 9.58%. Found: C, 68.58%; H, 7.95%; S, 9.94%.

U.V. spectrum: $\lambda_{max.}$ 286 m$\mu$, $\lambda_{max.}$ 311 m$\mu$, $\lambda_{max.}$ 324 m$\mu$.

The infra-red spectrum of the compound of this example is shown in FIG. 3 of the accompanying drawings.

With regard to the spectroscopic data set out above in respect of the compounds of the invention it may be noted that the ultraviolet absorption spectra of all of the esters of 2,7-di-tertiary-butylnaphthalene-4-sulfonic acid in the region 25–350 m$\mu$ shows minima at 251–252 and 318 m$\mu$, maxima at 294 and 322 m$\mu$ and an inflection point at 306 m$\mu$. The molar extinction coefficients are all within the same range of values. The ultra-violet absorption spectra of ethyl- and methyl-2,6-diteriary, butylnaphthalene-4-sulfonate in the region 250–340 m$\mu$ show minima at 251–252, 305 and 320 m$\mu$ and maxima at 286, 311 and 326 m$\mu$. The molar extinction coefficients are almost identical.

By way of illustration FIGS. 1, 2 and 3 show infra-red spectra respectively of ethyl-2,7-di-tertiary-butylnaphthalene-4-sulfonate, ethyl-2,6-di-tertiary-butylnaphthalene-4-sulfonate and methyl-2,6-di-tertiary-butylnaphthalene-4-sulfonate. The infra-red spectra of these three compounds in the region from 3.5 to 10 microns is similar since all three contain the same functional groups. The relevant information is summarized in Table I below. The finger-print region (10–15 microns) is similar for the esters of 2,6-di-tertiary-butylnaphthalene-4-sulfonic acid but different for the 2,7-isomer.

TABLE I

| Functional group | Compound and wavelength | | |
|---|---|---|---|
| | Ethyl 2,6- | Methyl 2,6- | Ethyl 2,7- |
| C—H | 3.42 | 3.40 | 3.42 |
| Naphthalene | 6.3, 6.9 | 6.28, 6.85 | 6.22, 6.85 |
| t-Butyl | 6.77, 7.97 | 6.77, 7.92 | 6.72, 7.98 |
| Sulfonate | 7.40, 8.45, 8.65 | 7.40, 8.42, 8.65 | 7.46, 8.51, 8.67 |

The anti-tussive activity of a mixture of the sodium salts of 2,6- and 2,7-di-tertiary-butylnaphthalene-4-sulfonic acids, the ethyl ester of 2,7-di-tertiary-butylnaphthalene-4-sulfonic acid and codeine have been compared in the guinea pig.

All compounds were administered by the oral route at a dose equivalent to 100 mgm./kgm. one hour before testing. Cough was elicited by placing the animals in an aerosol of 25% citric acid. The aerosol was produced by oxygen flowing at 10 l./minute through a glass nebuliser (De Vilbiss #40).

Guinea pigs were first screened to assure that they would react by coughing with citric acid. Twelve such animals were randomly allocated to three Latin Square Experimental Designs. At some time during the experiment each animal received each treatment once and served as their own control. Animals were exposed to the aerosol for a ten minute period and the number of coughing episodes recorded during this time. The animals were also served for a further 15 minutes after the exposure and the coughing episodes were also recorded during this time interval.

These data were examined statistically by analysis of variance, and the differences by which the treatment means must differ to be significant at the 95% and 99% level was calculated.

These results are summarized in Table II below. At the dose level chosen all compounds significantly decreased the number of coughing episodes both during the exposure period and the post-exposure period. There was no statistically significant difference between the mixture of sodium salts, the ethyl ester and codeine during the exposure period. In the post-exposure period, the mixture of sodium salts was more effective (95% level) in suppressing cough than the ethyl ester or codeine.

Acute oral and intraperitoneal toxicity of the mixture of sodium salts and the ethyl ester was investigated in the CFW mouse.

The mixture of sodium salts was found to have an $LD_{50}$ by the intraperitoneal route equivalent to 120 mgm./kgm. (83–173). Death occurred within 48 hours after administration.

The ethyl ester produced no deaths below 1000 mgm./kgm. after intraperitoneal injection. Doses up to 2000 mgm./kgm. resulted in a 10% mortality. Autopsy of some of these animals after 4 and 7 days showed a bloody exudate in the peritoneal cavity and the presence of a white material (presumably the ethyl ester). This white material had become enveloped in fibrous tissue. By the oral route no deaths were observed with either the mixture of sodium salts or the ethyl ester up to doses equivalent to 15 gms./kg. for a seven day period after administration.

The insoluble character and relatively low toxicity of these compounds prevented further evaluation of the toxicity of the ethyl ester and the mixture of sodium salts.

On the basis of these experiments it appears that, in the guinea pig, the mixture of sodium salts and the ethyl ester are equally effective as an anti-tussive agent one hour after an oral dose of 100 mgm./kgm. There was no significant difference between the anti-tussive action of these compounds and that of codeine phosphate under the conditions of this experiment.

It would appear that the ethyl ester is not well absorbed following intraperitoneal administration as compared with the mixture of sodium salts. The extremely low order of acute toxicity following oral administration of both these compounds precluded comparison of their relative absorption by this route.

It is, however, apparent that the mixture of sodium salts is absorbed orally, as a good anti-tussive effect was obtained in the guinea pig.

TABLE II

*Anti-Tussive Activity in the Guinea Pig*

| Treatment | Oral dose, mgm./kgm. | Number of coughing episodes produced by citric acid aerosol | |
|---|---|---|---|
| | | During 10 min. exposure | 15 min. post exposure |
| Control | | 44.8 | 7.3 |
| Mixture of Na salts | 100 | 20.3 | 1.5 |
| Ethyl ester | 100 | 15.2 | 2.8 |
| Codeine phos | 100 | 16.5 | 3.0 |
| 95% necessary difference=17.2 | | 95% necessary difference=4.4 | |
| 99% necessary difference=29.7 | | 99% necessary difference=6.9 | |

The esters of the invention may be incorporated as the active ingredients in anti-tussive compositions having conventional liquid non-toxic pharmaceutical vehicles. By way of example, an anti-tussive in solid tablet form may be produced in accordance with the following formulation which is suitable for the manufacture of seven thousand tablets:

(1) Ethyl ester _____gm__ 107
(2) Oil of lemon (terpeneless) _____cc__ 9
(3) Cherry flavour artificial _____cc__ 200
(4) Oil of peppermint (terpeneless) _____cc__ 7
(5) Menthol _____g__ 3
(6) Citric acid _____g__ 80
(7) FD and C Red #2, 2% solution _____cc__ 100
(8) Sucrose _____lb__ 34
(9) Liquid glucose _____lb__ 24
(10) Water _____lb__ 10

I claim:

1. Compounds of the formula:

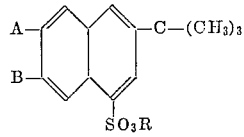

wherein one of A and B is tertiary butyl and the other is hydrogen, and wherein R is selected from the group consisting of alkyl, alkyl containing a hydroxyl group; —O—CH$_2$—COOH; cyclohexyl, phenyl and benzyl.

2. Compounds of the formula:

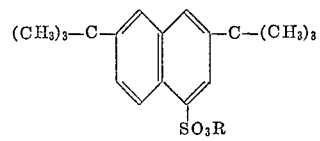

wherein R is selected from the group consisting of alkyl, alkyl containing a hydroxyl group; —O—CH$_2$—COOH; cyclohexyl, phenyl and benzyl.

3. Compounds of the formula:

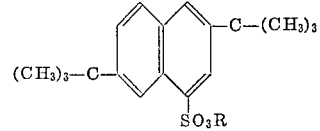

wherein R is selected from the group consisting of alkyl, alkyl containing a hydroxyl group; —O—CH$_2$—COOH; cyclohexyl, phenyl and benzyl.

4. The ethyl ester of 2,6-di-tertiary-butylnaphthalene-4-sulfonic acid.

5. The ethyl ester of 2,7-di-tertiary-butylnaphthalene-4-sulfonic acid.

6. The methyl ester of 2,6-di-tertiary-butylnaphthalene-4-sulfonic acid.

7. The methyl ester of 2,7-di-tertiary-butylnaphthalene-4-sulfonic acid.

8. The n-propyl ester of 2,7-di-tertiary-butylnaphthalene-4-sulfonic acid.

9. The n-butyl ester of 2,7-di-tertiary-butylnaphthalene-sulfonic acid.

10. The n-hexyl ester of 2,7-di-tertiary-butylnaphthalene-sulfonic acid.

11. The phenyl ester of 2,7-di-tertiary-butylnaphthalene-4-sulfonic acid.

12. The cyclohexyl ester of 2,7-di-tertiary-butylnaphthalene-4-sulfonic acid.

13. The glycolyl monoester of 2,7-di-tertiary-butylnaphthalene-sulfonic acid.

14. The glyceryl monoester of 2,7-di-tertiary-butylnaphthalene-sulfonic acid.

15. An anti-tussive preparation comprising an ester as claimed in claim 1 and a non-toxic pharmaceutical vehicle.

16. An anti-tussive preparation comprising an ester selected from the group consisting of the ethyl esters of 2,6- and 2,7-di-tertiary-butylnaphthalene-4-sulfonic acids and a non-toxic pharmaceutical vehicle.

17. An anti-tussive preparation comprising the ethyl ester of 2,7-di-tertiary-butylnaphthalene-4-sulfonic acid and a solid non-toxic pharmaceutical vehicle.

References Cited in the file of this patent

UNITED STATES PATENTS 2,486,416     Jackson _____ Nov. 1, 1949

FOREIGN PATENTS 520,742     Belgium _____ Dec. 16, 1953